United States Patent [19]
Morasca et al.

[11] Patent Number: 5,850,491
[45] Date of Patent: Dec. 15, 1998

[54] DOUBLE-STAGE ACOUSTO-OPTICAL WAVEGUIDE DEVICE, HAVING POLARIZATION-INDEPENDENT RESPONSE

[75] Inventors: Salvatore Morasca, Como; Steffen Schmid, Monza, both of Italy

[73] Assignee: Pirelli Cavi S.p.A., Milan, Italy

[21] Appl. No.: 794,739

[22] Filed: Feb. 3, 1997

[30] Foreign Application Priority Data

Jun. 20, 1996 [IT] Italy .................................. MI96A1245

[51] Int. Cl.⁶ ................................................... G02F 1/335
[52] U.S. Cl. ................................................................. 385/7
[58] Field of Search ................................... 385/4, 5, 6, 7, 385/8, 11, 16, 21, 1, 33, 116, 130, 141; 372/32, 13, 20, 21; 359/305, 311

[56] References Cited

U.S. PATENT DOCUMENTS

| | | |
|---|---|---|
| 3,958,863 | 5/1976 | Isaacs et al. ............................... 372/13 |
| 5,002,349 | 3/1991 | Cheung et al. . |
| 5,106,181 | 4/1992 | Rockwell, III ............................... 385/2 |
| 5,596,671 | 1/1997 | Rockwell, III ........................... 385/147 |
| 5,748,810 | 5/1998 | Schmid ....................................... 385/7 |

OTHER PUBLICATIONS

H. Herrmann et al., "Polarization Independent, Integrated Optical, Acoustically Tunable Wavelength Filters/Switches with Tapered Acoustical Directional Coupler", IEEE Photonics Technology Letters, 6(11):1335–1337 (1994).

Primary Examiner—Akm E. Ullah
Attorney, Agent, or Firm—Finnegan, Henderson, Farabow, Garrett, & Dunner, L.L.P.

[57] ABSTRACT

A double-stage acousto-optical waveguide device comprises two polarization conversion stages, a polarization selective input element, a polarization selective output element and two intermediate polarization selective elements that have two branches connected together and two branches not connected together that are located on opposite sides of the branches connected together and extend in lateral waveguides that reach the edges of the substrate.

11 Claims, 5 Drawing Sheets

DOUBLE-STAGE ACOUSTO-OPTICAL WAVEGUIDE DEVICE, HAVING POLARIZATION-INDEPENDENT RESPONSE

This application is based on application No. MI96 A 001245 filed in Italy, the content of which is incorporated hereinto by reference.

The present invention relates to a double-stage acousto-optical waveguide device, having polarization-independent response.

In telecommunications networks with wavelength-division multiplexing (WDM) a plurality of optical transmission signals independent one from the other, or several channels, are transmitted along the same line, consisting usually of an optical fiber. Wavelength multiplexing consists in a simultaneous transmission of signals at different wavelength. The transmission signals, or channels, can be either digital or analog and they are distinguished one from the other because a specific wavelength is associated with each of them.

Inside the networks there are nodes wherein the signals are switched from optical fiber lines that come together in a node to optical fiber lines that depart from the node. In order to direct the signals inside the node, simplifying its architecture, it is possible to use wavelength selection optical switches. In a receiving station, in order to separate the individual transmission signals, or channels, filters are used capable of transmitting a band of wavelengths centered on the wavelength of a channel and sufficiently narrow to block the adjacent channels.

Integrated acousto-optical devices are known comprising optical waveguides formed in a substrate of a birefringent and photoelastic material and at least one electro-acoustical transducer capable of generating a surface acoustic wave. The interaction between polarized optical signals propagating in the optical waveguides and the acoustic wave propagating at the surface of the substrate produces a conversion of the polarization of the signals. By controlling the frequency of the acoustic waves, it is possible to tune the spectral response curve of these acousto-optical devices and this makes them suitable for being used as switches and as filters in optical telecommunication networks with wavelength-division multiplexing.

These acousto-optical devices also allow the switching and the simultaneous selection of several channels, if the acoustic wave propagating at the surface of the substrate is the superposition of acoustic waves at different frequencies. In fact, the switches perform the combined switching of the signals at the wavelengths corresponding to the frequencies applied simultaneously and the filters have a passband corresponding to the set of different wavelength intervals, determined by the frequencies of the selected acoustic waves. By a suitable selection of such frequencies it is possible to control the central wavelength of the switch or of the filter so that they transmit only the desired wavelengths, corresponding to the selected channels.

In particular, these tunable switches and filters allow the selection of the channels to be changed.

Acousto-optical devices comprising one stage or two stages of polarization conversion are known.

In one-stage acousto-optical devices the polarization conversion by interaction between the optical signal and the piloting acoustic wave is accompanied by a frequency shift with a value equal to the frequency of the acoustic wave. Such frequency shift, for the same direction of the acoustic wave, has opposite sign depending on the polarization of the optical signal and, thus, the two separate orthogonal polarization components, TM (transversal magnetic) and TE (transversal electric), have a positive and negative frequency shift.

In order to eliminate the frequency shift, that can create beat problems in telecommunication networks, acousto-optical devices having two stages of polarization conversion have been proposed.

Cheung et al. in the U.S. Pat. No. 5,002,349 describe an acousto-optical device comprising a substrate of a birefringent material wherein there are formed two polarization conversion stages, arranged in alignment and four optical waveguide polarization splitters, arranged in pairs upstream and downstream each stage. An intermediate polarization splitter, located downstream from the first conversion stage, is aligned with an intermediate polarization splitter, placed upstream from the second conversion stage, and an optical absorber can be interposed between the two intermediate polarization splitters. One output of an intermediate polarization splitter is connected to an input of the other intermediate polarization splitter by means of a connecting waveguide and another output and another input of the two polarization splitters are connected to the optical absorber by means of respective connecting optical waveguides.

In this device phenomena of crosstalk can take place due to construction imperfections of the optical waveguides that constitute the polarization splitters and due to the closeness of the connecting waveguides linked to the polarization splitters and to the optical absorber. The crosstalk involves a transfer of optical power from one optical waveguide to an adjacent optical waveguide and causes residual or parasite signals to arise in the optical waveguides affected by it. The residual signals that are generated in the intermediate polarization splitters are transferred from one to the other of the connecting waveguides linked to the optical absorber, in spite of the presence of the latter, because the connecting waveguides are arranged very close one to the other. This can cause noise in the optical transmission signals leaving the acousto-optical device.

Moreover, part of the optical power that leaves the connecting optical waveguides can be dispersed in the substrate and re-enter in a random manner in any other optical waveguide of the device, causing a further worsening of the quality of the transmission signals leaving the device.

Now, it has been found that these drawbacks can be overcome with a double-stage acousto-optical waveguide device, having polarization-independent response, comprising a substrate of birefringent and photoelastic material, on which there are formed:

a) a first stage and a second one of polarization conversion of at least one optical signal having a preselected wavelength in a predetermined interval, b) a polarization selective input element and a polarization selective output element made in optical waveguide, respectively associated at input with said first polarization conversion stage and at output with said second polarization conversion stage, c) a first and a second intermediate polarization selective element made in optical waveguide, associated at output with said first polarization conversion stage and at input with said second polarization conversion stage, respectively, said intermediate polarization selective elements having two branches connected together and two branches not connected together, characterized in that d) said two branches not connected together of said intermediate polarization selective elements are located on opposite sides with respect to said branches connected together, and e) at least one of said two branches not connected together extends in a first lateral optical waveguide that reaches an edge of said substrate.

According to a preferred embodiment of the invention, the other of said two branches not connected together also extends in a second lateral optical waveguide that reaches an edge of said substrate.

One of the main advantages of the double-stage acousto-optical waveguide device, made according to the invention, consists in the total lack of phenomena of crosstalk. In fact, transfers of residual signals between the two branches not connected together of the intermediate polarization selective elements are prevented and dispersions of residual signals in the substrate are eliminated. This is obtained by means of a staggered arrangement of the polarization selective elements by means of their connection to at least one lateral optical waveguide.

The two stages of polarization conversion of the device are completely uncoupled and in fact there is a high degree of insulation between the transmitted channels (>30 dB) that constitutes an optimum value for wavelength division multiplexing (WDM) telecommunication networks having a high transmission speed.

Another advantage of the device according to the invention consists in the fact that the lateral optical waveguides can be used to control the calibration of the device, by a monitoring of the residual signals that allows the determination of frequency and acoustic power of the acoustic waves piloting the polarization conversion stages.

A further advantage of the acousto-optical device according to the invention consists in the possibility of obtaining it with a very simple manufacturing process because all the optical components can be made in one single step.

Features and advantages of the invention will now be illustrated with reference to an embodiment represented as a non-limiting example in the enclosed drawings, wherein:

Figure 1:
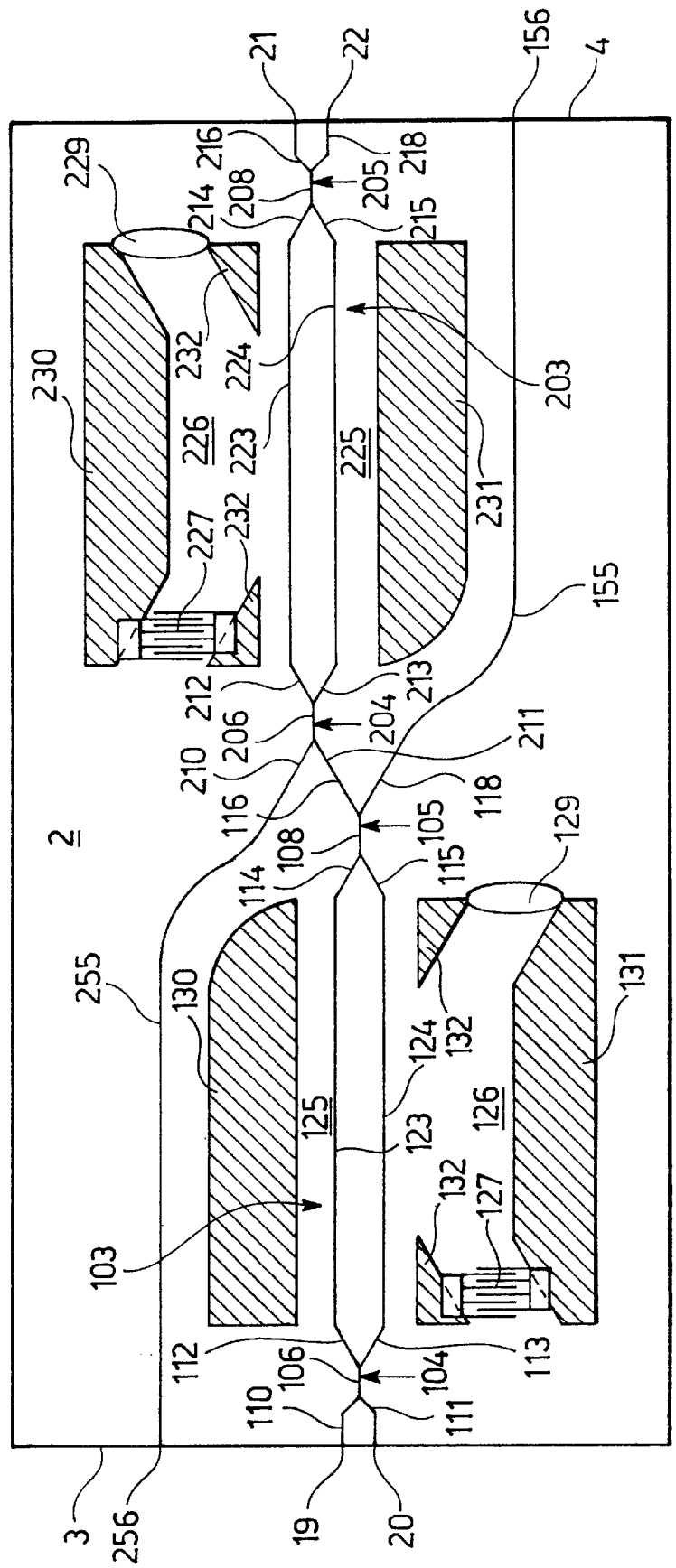
FIG. 1 shows diagrammatically a double-stage acousto-optical waveguide device, made according to the invention.

There is shown in FIG. 1 a double-stage acousto-optical waveguide device, having polarization-independent response, made according to the invention. The device comprises a substrate 2 in birefringent and photoelastic material, for example formed by a crystal of lithium niobate (LiNbO₃) cut perpendicularly to the crystallographic x-axis (x-cut) and with propagation of the radiation along the crystallographic y-axis (y-propagation).

In the substrate 2 there are included two polarization conversion stages, indicated as a whole with 103 and 203, a polarization selective input element, indicated as a whole with 104, a polarization selective output element, indicated as a whole with 205 and two intermediate polarization selective elements, indicated as a whole with 105 and 204.

The polarization conversion stage 103 comprises two optical waveguides 123 and 124, rectilinear and parallel, contained in an acoustic waveguide 125, and an acoustic waveguide 126 with which there is associated an electro-acoustical transducer 127.

The polarization conversion stage 203 comprises two optical waveguides 223 and 224, rectilinear and parallel, contained in an acoustic waveguide 225, and an acoustic waveguide 226 with which there is associated an electro-acoustical transducer 227.

The polarization conversion stages are substantially non collinear one with the other or staggered.

Each polarization selective element (or polarization splitter) 104, 105, 204 and 205 comprises a portion of multimode optical waveguide (preferably bimode) 106,108, 206, 208 connected at the two ends thereof to respective optical waveguide branches (connecting optical waveguides) 110, 111, 112, 113; 114, 115, 116, 118; 210, 211, 212, 213; 214, 215, 216, 218.

Each of the polarization selective elements 104 and 204 is capable of separating and sending out to different output branches the orthogonal polarization components TM and TE of an optical signal present on an input branch thereof. For example the polarization splitter 104 separates the polarization components TM and TE of an optical signal present in the input branch thereof 110 toward the branches 112 and 113, respectively. Each of the polarization selective elements 105 and 205 is capable of sending out to just one output branch the optical signals, with TE and TM polarization respectively, present on input branches of the polarization selective element connected to the same end of the portion of multimode waveguide. For example the polarization splitter 105 sends out to the output branch 116 the polarization components TM and TE of optical signals present in the input branches 114 and 115, respectively.

The branches 110 and 111 of the polarization splitter 104 are connected to input ports 19 and 20 and the branches 216 and 218 of the polarization splitter 205 are connected to output ports 21 and 22.

The branches 112 and 113 of the polarization splitter 104 and the branches 114 and 115 of the polarization splitter 105 are connected to the optical waveguides 123 and 124. The branches 212 and 213 of the polarization splitter 204 and the branches 214 and 215 of the polarization splitter 205 are connected to the optical waveguides 223 and 224.

The intermediate polarization splitters 105 and 204 are connected together through the respective branches 116 and 211 connected in series.

According to the invention, the branch 118 of the polarization splitter 105 and the branch 210 of the polarization splitter 204, not connected together (separated) are located on opposite sides with respect to the branches 116 and 211 connected in series, the branch 118 is connected to a lateral waveguide 155 and the branch 210 is connected to a lateral waveguide 255.

The lateral waveguide 155 extends in a direction parallel to the waveguide branches 223 and 224 as far as an edge 4 of the substrate 2 on which the output ports 21 and 22 are situated. The lateral waveguide 155 is connected to an output port 156. The lateral waveguide 255 extends in a direction parallel to the waveguide branches 123 and 124 as far as an edge 3 of the substrate 2 on which the output ports 19 and 20 are situated. The lateral waveguide 255 is connected to an input port 256.

The arrangement of the connecting branches 118 and 210, not connected together, on opposite sides with respect to the connecting branches 116 and 211 connected together and their connection to lateral waveguides 155 and 255 avoids the possible coupling of spurious radiation between the branches 118 and 210 and eliminates the possible crosstalk between the branches 118 and 210, allowing a total uncoupling of the conversion stages 103 and 203 to be obtained. In particular, the elimination of the crosstalk between the branches not connected together 118 and 210 of the polarization splitters 105 and 204 leads to a considerable improvement in the overall performance of the device, especially as regards crosstalk between channels at different wavelengths.

The electro-acoustical transducers 127 and 227 are formed by interdigitated electrodes capable of generating surface acoustic waves at radio frequency. In the specific case, in the polarization conversion stages 103 and 203 the surface acoustic waves are collinear with the optical signals in the optical waveguides 123,124, 223, 224.

The acoustic waveguides 125, 126 and 225, 226 are formed by means of respective areas 130, 131, 132, 230, 231 and 232 wherein the speed of the acoustic waves is higher than in the guides 125, 126, 225 and 226, that constitute an acoustic cladding. The acoustic waveguides 126 and 226, at ends of which there are respective acoustic absorbers 129 and 229, are side by side and communicate with the acoustic waveguides 125 and 225 so as to form acoustic couplers. The acoustic coupling between the acoustic waveguides 125 and 126 and between the acoustic waveguides 225 and 226 can be accomplished so that the intensity profile of the surface acoustic wave along the waveguides 125 and 225 has a maximum in the central portion of the guides and two minima at the ends of the guides. In this case the optical signals propagating along the optical waveguides 123, 124 and 223, 224 interact with an acoustic wave having an intensity that increases up to half way along the waveguide and decreases in the other half of the waveguides.

In the device according to the invention, the propagation of the acoustic waves in the substrate does not need to be guided, or, conveniently, it can be guided by means of acoustic waveguide structures known and different from the one described.

The input ports 19, 20 and output ports 21 and 22 are connected to line optical fibers by means of suitable connecting elements, not shown.

The acousto-optical device according to the invention has the advantage of being reversible in the sense that the output ports 21, 22 and 156 can be used as input ports and the input ports 19, 20 and 256 can be used as output ports.

The acousto-optical device described previously is suitable for being used as i) a pass-band filter; ii) a band-stop filter; iii) a power equalizer; iv) an add/drop node; v) a switch.

The acousto-optical device of FIG. 1 operates as a pass-band filter, for example between the input port 20 and the output port 21, that can be tuned by selecting the optical signals having a wavelength corresponding to the piloting acoustic frequency.

The optical signals enter through the input port 20 and in the polarization splitter 104 their orthogonal polarization components TM and TE are separated. When the filter is in the off-state, the polarization components propagate separately in the waveguides 123 and 124, they are recombined in the polarization splitter 105, that acts as a recombinator, and leave through the connecting branch 118, propagating in the lateral waveguide 155 as far as the output port 156.

Applying an appropriate signal to the electrodes of the electro-acoustical transducers 127 and 227, the acousto-optical filter is activated (on-state). In the conversion stages 103 and 203 a polarization conversion is performed of the orthogonal polarization components TM and TE of the selected signals. The optical signals enter through the port 20, their orthogonal polarization components TM and TE are separated in the polarization splitter 104 and they propagate separately in the optical waveguides 123 and 124 of the conversion stage 103 where they interact with the surface acoustic wave emitted by the transducer 127 and they are subjected to a polarization conversion to the state of orthogonal polarization TM→TE and TE→TM.

At the output from the conversion stage 103 the orthogonal polarization components TE and TM of the selected signals are recombined in the polarization splitter 105 and leave through the intermediate output constituted by the connecting branch 116. The polarization components in a recombined form are transmitted by the output 116 to the input of the conversion stage 203 constituted by the connecting branch 211 connected to the polarization splitter 204. In the polarization splitter 204 the orthogonal polarization components TE and TM of the selected optical signals are separated and they propagate separately in the optical waveguides 223 and 224 of the conversion stage 203 where they interact with the surface acoustic wave emitted by the transducer 227 and they are subjected to a polarization conversion to the state of orthogonal polarization TM→TE and TE→TM.

At the output of conversion stage 203 the orthogonal polarization components TE and TM are recombined in the polarization splitter 205 and propagate in the connecting branch 216 connected to the output port 21.

The polarization splitters 104, 105, 204 and 205 are not ideal and they can exhibit construction imperfections that cause crosstalk. There is a transfer of optical power from one segment of optical waveguide to the side-by-side segment of optical waveguide of a polarization splitter according to a splitting ratio SR=$\alpha/1-\alpha$, where $\alpha$ is the crosstalk of the polarization splitter. Due to the presence of this phenomenon, an optical signal Si that is propagated through a segment of waveguide of a polarization splitter is diminished by a quantity $\alpha$Si and at the output of the waveguide branch there is a signal Su=Si(1-$\alpha$). In the waveguide segment arranged on the side, wherein, ideally, there should be no signal, there is however a residual or parasite component of signal consisting of the fraction $\alpha$Si.

In a conversion stage connected to an input polarization splitter and to an output polarization splitter there is crosstalk or interband insulation $\alpha$ (wavelength-crosstalk) ranging from −20 dB to −25 dB and an intraband insulation $\beta$ (notch) ranging from −17 dB to −20 dB.

In the case wherein two signals S1 and S2 enter the conversion stage where a surface acoustic wave having a piloting frequency f2 selects the signal S2, at the direct-state (bar state) output there are the signal that has not been selected S1 and a residual signal $\beta$S2 and at the cross-state output there are the signal that has been selected S2 and a residual signal $\alpha$S1.

Figure 2:
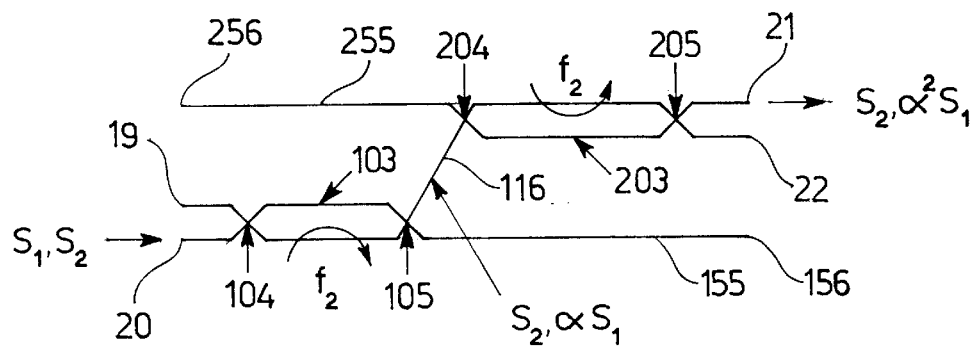
FIGS. 2–4, 4a, 4b–8 show diagrammatically some types of usage of the device of FIG. 1.

FIG. 2 illustrates diagrammatically the operation of the pass-band filter made according to the invention. In the condition of cross-state of the filter, through the input port 20 there enter two signals S1 and S2, of which S2 is the signal selected by means of the surface acoustic wave, having a frequency f2 corresponding to the conversion for a signal at the wavelength of the signal S2, and shown diagrammatically by the arrow f2. On the connecting branch 116 of the intermediate polarization splitter 105 there are the signal S2 and a residual component of signal $\alpha$S1 while on the connecting branch 118 of the polarization splitter 105 there is the signal (1−$\alpha$)S1 that is carried outside the substrate 2 by means of the lateral waveguide 155. The signals S2 and $\alpha$S1 propagate through the second conversion stage 203 and at the output port 21 of the filter there are the signal S2 and a residual component of signal $\alpha^2 S1$. Through the waveguide 22 a residual component of signal equal to $(1-\alpha)\alpha S1$ is carried outside the substrate 2.

With a crosstalk $\alpha$ there is a very low residual signal at output $\alpha^2 S1$ (second order). In this way an interband insulation with a value >40 dB is obtained and a complete uncoupling between the two conversion stages 103 and 203 is accomplished eliminating almost completely the phenomenon of crosstalk between the first and the second conversion stage. Thus, the device has a total extinction ratio (ratio between power at output from the device for an attenuated polarization component and total outgoing power) with a high value.

The lateral waveguides 155 and 255 have a geometry that avoids any crossover or intersection between them. It is thus also possible to use them to detect, during the step wherein the component is calibrated, the effect of the frequency and of the power of the piloting acoustic wave.

Figure 3:
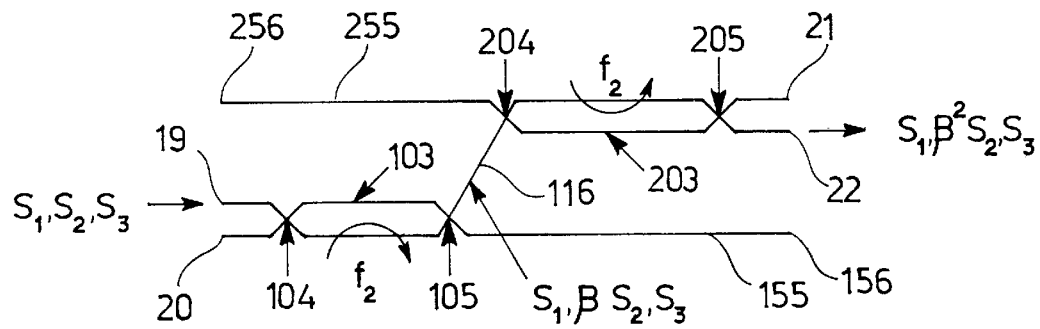

FIG. 3 illustrates the operation of a stop-band filter made according to the invention. In this case, in the condition of cross-state of the conversion stage, through the input port 19 there enter three signals S1, S2 and S3, of which S2 is the signal selected by means of the surface acoustic wave shown diagrammatically by the arrow f2. On the connecting branch 116 of the intermediate polarization splitter 105 there are the signals S1 and S3 and a residual component of signal $\beta S2$, while on the connecting branch 118 of the splitter 105 there is the signal $(1-\beta)S2$ that is carried outside the substrate 2 by means of the lateral waveguide 155. The signals S1, S3 and $\beta S2$ pass through the second conversion stage 203 and at the output port 22 of the filter there are the signals S1, S3 and a residual component of the signal $\beta^2 S2$. Through the waveguide 21 a residual component of signal equal to $(1-\beta)\beta S2$ is carried outside the substrate 2.

With a crosstalk $\beta$ having a value equal to $-17$ dB, there is a very low residual signal at output $\beta^2 S2$. In this way an interband insulation with a value equal to more than 30 dB is obtained and a complete uncoupling between the two conversion stages 103 and 203 is accomplished eliminating almost completely the phenomenon of crosstalk between the first and the second conversion stage.

In this case, moreover, there is a very narrow band, with an amplitude equal to about ⅔ of the band of a device having a single stage.

In the acousto-optical device according to the invention the frequency shift is null. In fact, in the conversion stage 103 the polarization components TM and TE are subjected to a polarization conversion in the orthogonal state that is accompanied by a frequency shift. The sign of the frequency shift depends on the polarization and on the direction of propagation of the surface acoustic wave generated by the transducer 127 in relation to the direction of propagation of the optical wave (collinear or counterlinear). Passing in the conversion stage 203, the frequency shift is compensated by the retroconversion of the polarization components TM and TE into the original polarization state, in the case wherein the surface acoustic wave generated by the transducer 227 is propagated in the same direction and has the same frequency as the acoustic wave generated by the transducer 127. The same frequency for the two acoustic waves is obtained by supplying a single electrical piloting signal to the two transducers 127 and 227.

Figures 4, 4A, 4B:
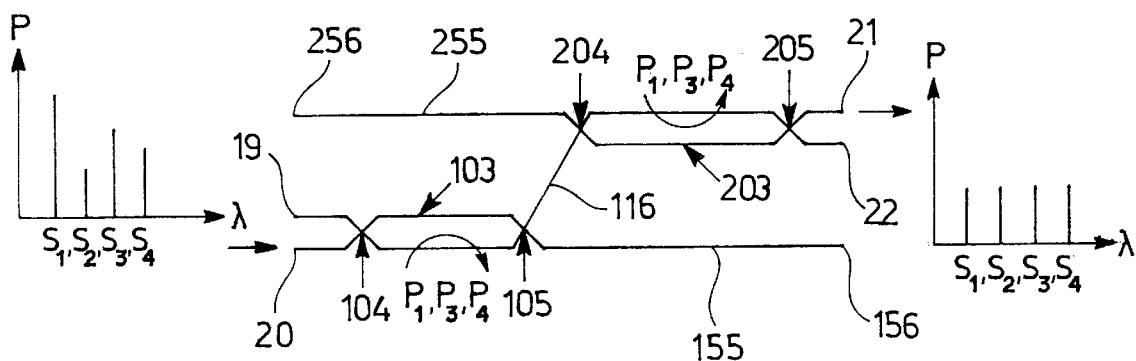

The operation of the acousto-optical device as a power equalizer in optical multiwavelength lines with powers of different value is illustrated in FIG. 4. The conversion efficiency q is given by the equation:

$$\eta = \sin^2(\gamma L \sqrt{P})$$

where $\gamma$ depends on the efficiency of the acousto-optical transducer and on the physical properties of the substrate material; L is the length of the acousto-optical interaction section; P is the power of the electro-acoustical transducer.

By tuning the powers $P_i$ of the radio frequency acoustic waves emitted by transducers 127 and 227, it is possible to select the conversion efficiency for the different wavelengths so that the corresponding output powers are uniform, as shown in the graphs of FIGS. 4a and 4b. In this case, the device behaves like a multiwavelength tunable attenuator.

Figure 5:
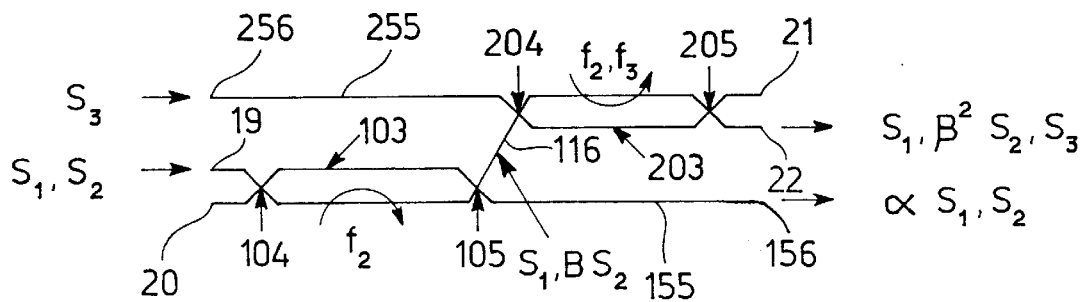

FIG. 5 illustrates the operation of the acousto-optical device as a switch, or add/drop node. In this case, two signals S1 and S2 coming from a line of the telecommunication network enter through the port 19. The signal S2 must be extracted from the line through the port 156 and a signal S3 to be directed onto the line enters through the port 256, that acts as an add port, and is propagated through the lateral waveguide 255. In the first conversion stage 103 there acts a surface acoustic wave having a piloting frequency f2 and on the connecting branch 116 of the intermediate polarization splitter 105 there are the signal S1 and a residual component of the signal $\beta S2$. Through the lateral guide 155 there are propagated the signal S2 and a residual component of signal $\alpha S1$, where $\alpha$ is equal to about 23 dB. The signals S2 and $\alpha S1$ leave through the port 156 that acts as a drop port. In the second conversion stage 203 there act two surface acoustic waves having piloting frequency f2 and f3 and at the output 22 of the node, connected to the line, there are the signals S1 and S3 and a residual component of the signal of the second order $\beta^2 S2$, where $\beta^2$ is less than about 34 dB.

Thus, the signal S2 that is extracted from the add/drop node leaves practically no trace in the output connected to the line (crosstalk of about 40 dB).

Figure 6:
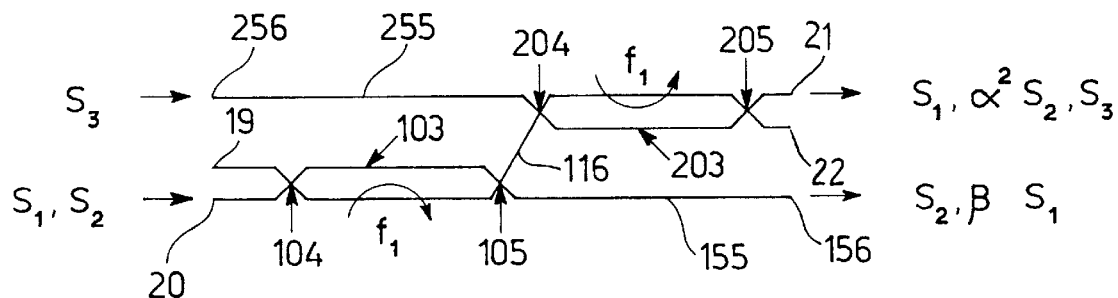

FIG. 6 illustrates the operation of a switch, or add/drop node in the case wherein two signals S1 and S2 coming from the line enter through the port 20 and the signal S1 is selected by means of a surface acoustic wave having a frequency f1 in both the conversion stages 103 and 203. An additional signal S3 enters through the port 256 and is propagated through the lateral waveguide 255. At the output 21, connected to the line, there are the signals S1 and S3 and the residual component of the signal $\alpha^2 S2$, where $\alpha^2$ is less than about 40 dB. At the output port 156 of the lateral waveguide 155 there are the signal S2 and the residual component of the signal $\beta S1$, where $\beta$ is equal to about 20 dB.

An insulation is obtained between the outputs 156 and 21 higher than 40 dB in the passive state.

Figure 7:
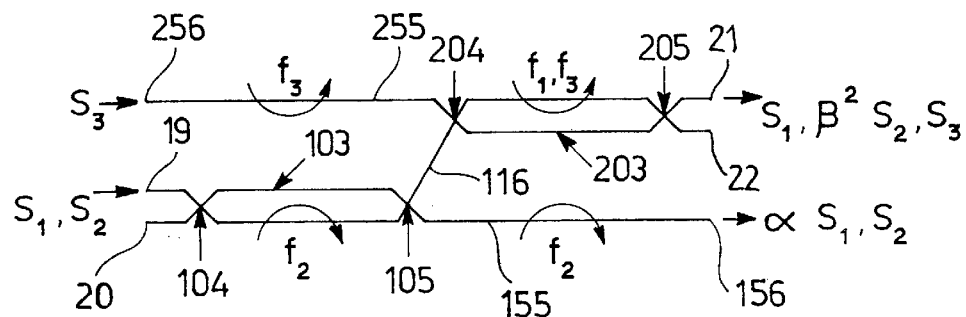

FIG. 7 illustrates the operation of a switch, or add/drop node that constitutes a variant of that of FIG. 5. In this case, with each lateral waveguide 155 and 255 there is associated an electro-acoustical transducer that generates a surface acoustic wave having frequency f2 and f3, respectively, with the object of compensating for the frequency shift of opposite sign of the signals S2 and S2, extracted and introduced, respectively.

Figure 8:
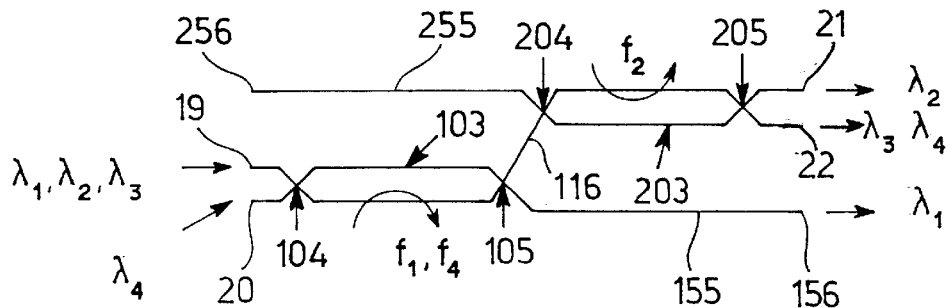

FIG. 8 illustrates the operation of a 2×3 (or 1×3) multiplexer/demultiplexer switch. Signals at different wavelengths $\lambda 1, \lambda 2, \lambda 3$ enter through the port 19 and a signal with a wavelength $\lambda 4$ enters through the port 20. The signals with a wavelength $\lambda 1$ and $\lambda 4$ are selected in the conversion stage 103 by means of surface acoustic waves having frequency f1 and f4, so that the signal having wavelength $\lambda 1$ is propagated through the lateral waveguide 155 and leaves through the port 156. In the conversion stage 203 the signal is selected having a wavelength λ2 by means of a surface acoustic wave having frequency f2 so that at the output 21 that signal is present and at the output 22 there are present the signals that have not been selected, having wavelength λ3 and λ4. In this case the lateral waveguide 255 can be omitted.

Figure 9:
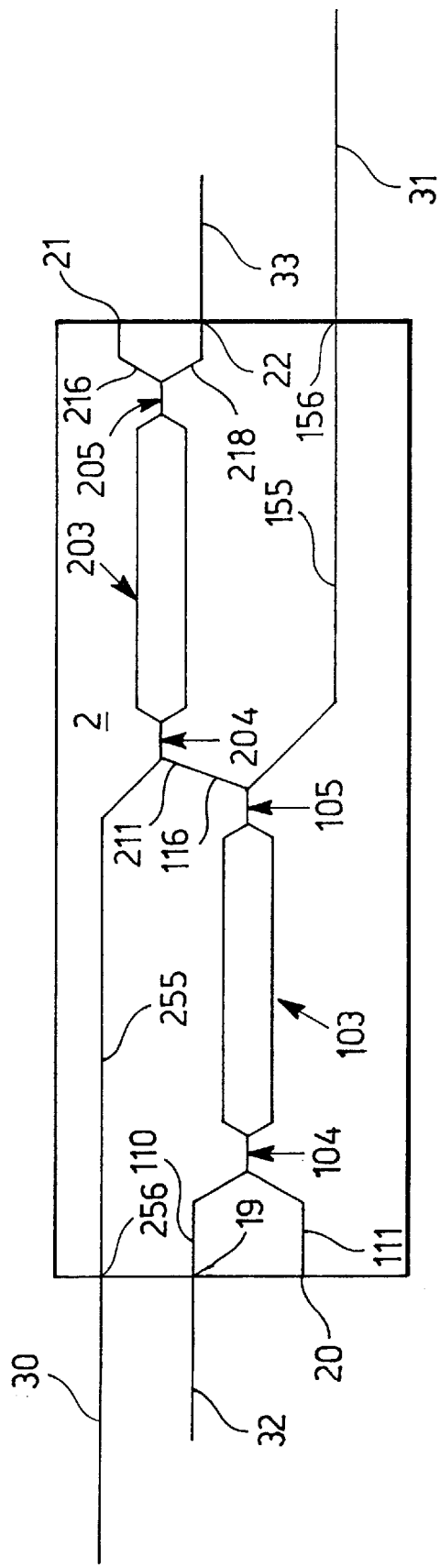
FIG. 9 shows diagrammatically a variant of the acousto-optical device of FIG. 1.

There is shown in FIG. 9 a variant of the acousto-optical device of FIG. 1 wherein the ports 20 and 21 can be connected to monomode line optical fibers, not shown, while the lateral waveguides 255 and 155 and the connecting branches 110 and 218 of the polarization splitters 104 and 205 are connected, through the respective ports 256, 156, 19 and 22, to portions of monomode birefringent optical fiber 30, 31, 32 and 33, respectively, of the polarization-maintaining type, that form external optical paths for compensating polarization mode dispersion, as will be illustrated later. In turn, the optical birefringent fibers 30, 31, 32 and 33 are connected to monomode line optical fibers, not shown.

The phenomenon of polarization mode dispersion (PMD) takes place in acousto-optical devices manufactured in birefringent materials such lithium niobate. Such materials have two refractive indices of different value, one ordinary $n_o$ and the other extraordinary $n_e$, for the different polarizations. Thus, the optical signals that pass through these acousto-optical devices are subjected to a split into the two orthogonal polarization components, TM and TE that are propagated one with the ordinary refractive index $n_o$ and the other with the extraordinary refractive index $n_e$.

Thus, generally, the two polarization components TM and TE have transit times of different value. The difference in the transit times of the two polarization components causes a shift of the signal dependent on the polarization called "polarization mode dispersion" (PMD).

In particular, the transit time t necessary to pass through an optical path of length L in a material having a refractive index n is given by the following expression:

$$t = n \cdot L / c,$$

where $c = 3 \cdot 10^8$ m/s is the speed of light in a vacuum.

The difference in transit time or differential delay Δt of the two orthogonal polarization components having refractive index $n_o$ and $n_e$ in the optical path of length L is given by the following expression:

$$\Delta t = (n_o - n_e) \cdot L / c = \Delta n \cdot L / c$$

where Δn is the difference between the ordinary and extraordinary refractive indices, or index of birefringence.

The result of this is a phase shift between the two polarization components that can cause a degradation of the optical signal in terms of the error rate (Bit Error Rate, BER).

For example, in a planar acousto-optical device made in an x-cut crystal of lithium niobate, having propagation along the y-axis (y-propagation) and thus with the optical axis z in the plane of the propagation, the polarization component TM is perpendicular to the plane of propagation and it has an ordinary refractive index and the polarization component TE is parallel to the plane of propagation and it has an extraordinary refractive index. At wavelengths of around 1550 nm, the ordinary refractive index of the $LiNbO_3$ is equal to about 2.226 while the extraordinary refractive index is equal to about 2.154. Similar differences in the refractive index between the components TE and TM are also seen in waveguides made, for example, by diffusion of titanium.

In a device with a length of about 60 mm a polarization mode dispersion of about 15 ps ($15 \cdot 10^{-12}$ s) is calculated.

The Applicant has observed experimentally, in an acousto-optical device of the conventional type, a dispersion equal to the calculated value when the device was in the passive state, while a zero value of PMD has been measured in the device in the active state. It has been determined that such nullification derives from the conversion between the two polarizations half way along the device and from the symmetry of the device itself.

In high-speed digital optical telecommunication networks (10 Gbit/s) the temporal distance between two successive pulses (bits) of a signal can be of the order of 50 ps. A phase shift of the two polarization components of the same bit (split), induced by the connected device, with a value of 15 ps (or with a higher value, in the case of devices in cascade) can cause superposition between successive bits and worsen the quality of transmission even in terms of the error rate (BER).

The device of FIG. 9 has the advantage of eliminating the polarization mode dispersion by means of the external optical compensation paths formed by the birefringent optical fibers 30, 31, 32, 33.

Suitable birefringent optical fibers of the polarization maintening type are for example those exhibiting elements of internal tension called "PANDA", those with an oval inner clad and such like.

The transversal cross-section of these fibers exhibits an axis known as "slow" and an axis known as "fast", perpendicular one to the other. Signals with a polarization parallel to the slow axis propagate according to a first refractive index, with a speed lower than the signals having a polarization parallel to the fast axis of the fiber, that propagate according to a different refractive index.

The birefringence typical of these fibers, that is the difference between the refractive indices related to the two axes, is of the order of Δn≈0.0001–0.001.

A "PANDA" fiber suitable for a wavelength of 1550 nm is that of the Fujikura firm identified by the letters SM (C) 15-P.

The birefringent optical fibers 30 and 31 have a preselected length $L_e$, while the birefringent optical fibers 32 and 33 have a preselected length $L_e/2$.

The length $L_e$ is linked to the length $L_d$ of optical paths formed by the waveguides integrated in the substrate 2 by the expression:

$$L_e = L_d \cdot \Delta n_d / \Delta n_e$$

where $\Delta n_d$ is the value of birefringence of the waveguides integrated on the substrate 2 and $\Delta n_e$ is the value of birefringence of the birefringent optical fibers 30, 31, 32 and 33.

The portions of the birefringent optical fibers 30, 31, 32 and 33 are oriented, with respect to the optical waveguides integrated on the substrate 2, in particular 255, 155, 110, 111, 123, 124, 223, 224, 216, 218, so that the slow axis thereof coincide with the fast axis (z in the specific case) of the waveguides integrated on the substrate 2 and the fast axis thereof coincide with the slow axis (x in the specific case) of the waveguides integrated on the substrate 2. In this way the polarization component of the optical signal that has a lower speed in the external optical paths 30, 31, 32 and 33 has a higher speed in the optical paths formed by the waveguides in the substrate 2, while the other polarization component, that has a higher speed in the external optical paths 30, 31, 32 and 33, has a lower speed in the optical paths formed by the waveguides in the substrate 2. The total path time in the external optical paths 30, 31, 32 and 33 and in the optical paths formed by the waveguides of the substrate 2 are made in this way substantially the same (equivalent) for the two polarization components. Said in other terms, the propagation times of the two polarization components in the entire optical path formed by the waveguide optical path of the substrate 2 and by the external compensation optical path 30, 31, 32 and 33 are substantially the same one with the other.

Thus, in the device of FIG. 9, the optical fibers 30, 31, 32 and 33 having the abovementioned orientations and length $L_e$ and $L_e/2$ allow a compensation of the polarization modal dispersion to be achieved (zero temporal shift, that is $\Delta t=0$).

In a variant of the device of FIG. 9, the external compensation optical paths can be formed by external optical waveguides integrated in additional substrates of lithium niobate glued to the substrate 2. In this case, the additional substrates are cut in a direction perpendicular to the z-axis (z-cut), and the propagation of the radiation takes place along the y-axis (y-propagation). The external waveguides, that replace the birefringent fibers 30 and 31, have a length $L_{e1}$ equal to the length $L_d$ of the substrate 2, while the external waveguides, that replace the birefringent fibers 32 and 33 have a length $L_{e2}$ equal to the length $L_d/2$. The external optical waveguides are oriented with respect to the optical waveguides integrated in the substrate 2 so that the z-axis of the additional substrates coincides with the x-axis of the substrate 2.

Figure 10:
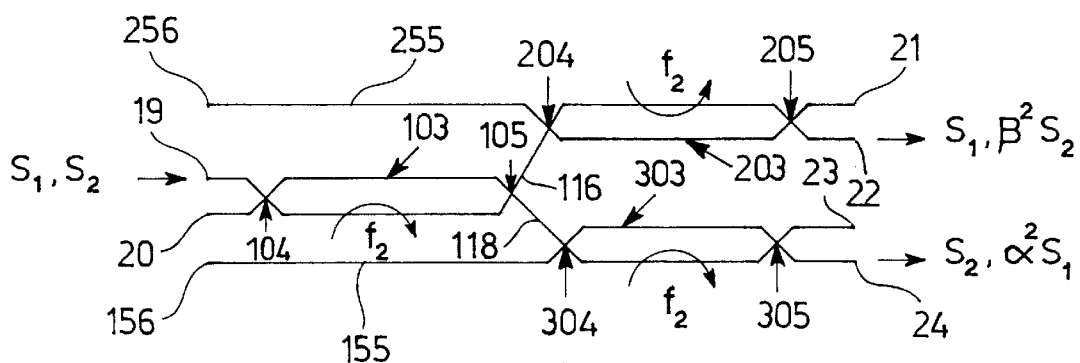
FIGS. 10–12 show diagrammatically further variants of the acousto-optical device of FIG. 1.

FIG. 10 shows a switch, or add/drop node that constitutes a variant of that of FIG. 5. In this case, a third polarization conversion stage 303 is connected to the intermediate polarization splitter 105 by means of a further intermediate polarization splitter 304 and to a further output polarization splitter 305. The conversion stage 303 is capable of generating a surface acoustic wave at piloting frequency f2. The polarization splitter 304 is connected to the polarization splitter 105 by means of a connecting branch 118 and to the lateral waveguide 155. The polarization splitter 305 is connected to further output ports 23 and 24. The addition of the third conversion stage 303 allows the insulation between the extracted signal S2 and the signal S1 to be increased to about 40 dB. If a unidirectional device is required, the lateral waveguide 155 can be omitted.

Figure 11:
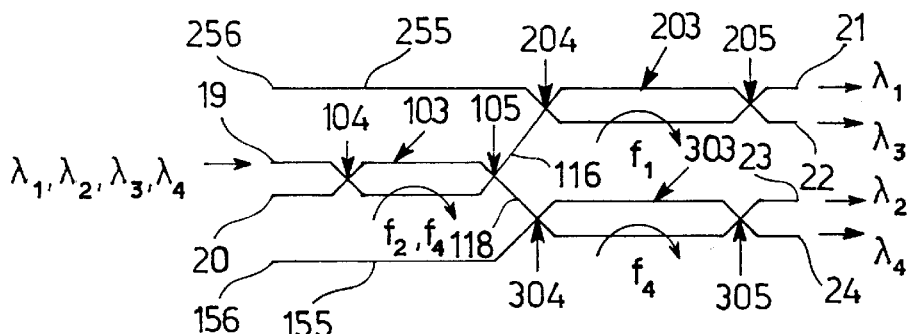

FIG. 11 shows a 2×4 (or 1×4) multiplexer/demultiplexer switch having a structure similar to the switch of FIG. 9. Signals having different wavelength values λ1, λ2, λ3 and λ4 enter through the input port 19 into the conversion stage 103 where they interact with surface acoustic waves having frequency f2 and f4. The signals having wavelength λ1 and λ3 leave through the direct-state output of the polarization splitter 105 and enter into the conversion stage 203, where they interact with a surface acoustic wave having frequency f1, and leave separately through the ports 21 and 22. The signals having a wavelength λ2 and λ4 leave through the cross-state output of the polarization splitter 105 and enter into the conversion stage 303, where they interact with a surface acoustic wave having frequency f4, and leave separately through the ports 23 and 24. In this case, one of the two lateral waveguides 155 and 255 can be omitted.

Figure 12:
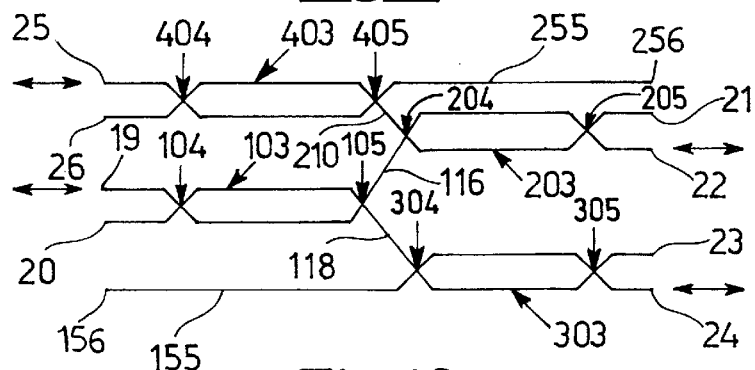

FIG. 12 shows a switch, or add/drop node comprising, in addition to the third polarization conversion stage 303, a fourth polarization conversion stage 403. The fourth polarization conversion stage 403 is connected to an input polarization splitter 404 and to an output polarization splitter 405. In turn the splitter 405 is connected to the polarization splitter 204 by means of the connecting branch 210 and to the lateral waveguide 255. The ports 19, 20, 21 and 22 are connected to the line. The polarization splitter 404 is connected to input ports 25 and 26 through which the signals to be added or subtracted are introduced and signals to be added or subtracted are also introduced through the ports 23 and 24.

This latter switch has the advantage of exhibiting an insulation between all the ports greater than 40 dB and of being bidirectional in the sense that the input ports can be used as output ports and vice versa.

In further variants of the invention, the conversion stages can have a structure different from that previously described. For example each stage can comprise optical waveguides situated in respective acoustic waveguides.

The electro-acoustical transducers 127 and 227 generate surface acoustic waves at radio frequency with a piloting acoustic frequency $f_{ac}$ (about 174±10 MHz, for devices operating at 1550 nm and 210±10 MHz for those operating at 1300 nm). Such piloting frequency corresponds to the optical resonance wavelength at which the polarization conversion TE→TM and TM→TE takes place.

The acousto-optical device according to the invention is suitable for operating at room temperature with a band of optical wavelengths at least 100 nm wide centered round the wavelength of 1550 nm or of 1300 nm, that are particularly interesting for optical telecommunications.

Lithium niobate can be replaced by another birefringent and photoelastic material selected in the group $LiTaO_3$, $TeO_2$, $CaMoO_4$.

The optical waveguides and the polarization splitters can be made by diffusion in the substrate 2 of a compound capable of increasing the refractive index, such as Ti. Using a photolithographic mask, it is possible to depose a layer of Ti having a thickness of about 120 nm, for example, subjecting it to a subsequent diffusion for 9 hours at a temperature of 1030° C. The mask can have an opening with a width of, for example, about 7 microns, in correspondence of the optical waveguides and of the connecting branches between the optical waveguides and the polarization splitters and between the latter and the input and output ports.

The acoustic waveguides 125, 126, 225 and 226 can be made by means of a photolithographic mask that circumscribes the areas 130, 131, 132, 230, 231 and 232 of the substrate 2 wherein the acoustic cladding is formed. Inside the surface defined by the openings of the mask a layer of Ti is deposed having a thickness, for example, of 160 nm and subsequently a diffusion of the Ti in the substrate for 31 hours is made in an oven at a temperature of 1060° C. The result of the diffusion is to increase the speed of the acoustic waves by about 0.3% so that the areas 130, 131, 132, 230, 231, 232 interact confining the acoustic waves along the guides 125, 126, 225 and 226.

The optical waveguides, except for the waveguide portions 106, 108, 206, 208 of the polarization splitters, are preferably monomode for the optical or acoustic waves used.

The interdigitated electrodes of the electro-acoustical transducers 127 and 227 can be made by depositing on the substrate a metal layer, for example aluminum, with a thickness of about 500 nm. The electrodes can be deposited in the substrate 2 (piezoelectric) with an inclination of about 5° with respect to the y-axis. The transducers 127 and 227 can, for example, include 15–20 or more pairs of interdigitated electrodes with a period of about 20.8 microns. Preferably, the electrodes have a variable pitch ("chirp") to extend the response band. The period of the electrodes is selected in relation to the wavelength in the lithium niobate of a surface acoustic wave operating the TM→TE conversion at the optical wavelength of interest, for example around 1550 nm.

The acousto-optical devices described previously can be tuned in a range of wavelengths from about 1500 nm to about 1600 nm. It is possible to tune the acousto-optical device to the wavelength of 1550 nm or of 1600 nm, shifted by 50 nm with respect to the central wavelength of 1550 nm, by supplying the interdigitated electrodes with a power of about 100 mW against the (about) 50 mW required for operation at the central wavelength.

We claim:

1. A double-stage acousto-optical waveguide device, having polarization-independent response, comprising a substrate of birefringent and photoelastic material, on which there are formed:

a) a first and a second stage of polarization conversion of at least one optical signal having a preselected wavelength in a predetermined interval, b) a polarization selective input element and a polarization selective output element made in optical waveguide, respectively associated at input with said first polarization conversion stage and at output with said second polarization conversion stage, c) a first and a second intermediate polarization selective element made in optical waveguide, associated at output with said first polarization conversion stage and at input with said second polarization conversion stage, respectively, said intermediate polarization selective elements having two branches connected together and two branches not connected together, characterized in that d) said two branches not connected together of said intermediate polarization selective elements are located on opposite sides with respect to said branches connected together, and e) at least one of said two branches not connected together extends in a first lateral optical waveguide that reaches an edge of said substrate.

2. An acousto-optical device according to claim 1, characterized in that the other of said two branches not connected together also extends in a second lateral optical waveguide that reaches an edge of said substrate.

3. An acousto-optical device according to claim 1, wherein said first and second polarization conversion stages are substantially not collinear one with the other.

4. An acousto-optical device according to claim 2, characterized in that said lateral waveguides are connected to respective input/output ports.

5. An acousto-optical device according to claim 2, characterized in that said lateral waveguides and connecting branches of said polarization selective input and output elements are connected to respective external optical paths for compensating polarization mode dispersion.

6. An acousto-optical device according to claim 5, characterized in that said external optical compensation paths connected to said lateral waveguides are formed by birefringent optical fibers having a length $L_e$ and said optical compensation paths connected to said connecting branches are formed by birefringent optical fibers having a length $L_e/2$, where $L_e$ is determined by the expression: $L_e = L_d \cdot \Delta n_d / \Delta n_e$.

7. An acousto-optical device according to claim 1, wherein a third polarization conversion stage is interposed between said first polarization conversion stage and said first lateral waveguide.

8. An acousto-optical device according to claim 7, characterized in that a fourth polarization conversion stage is interposed between said second polarization conversion stage and said second lateral waveguide.

9. An acousto-optical device according to claim 2, wherein said first and second polarization conversion stages are substantially not collinear one with the other.

10. An acousto-optical device according to claim 2, wherein a third polarization conversion stage is interposed between said first polarization conversion stage and said first lateral waveguide.

11. An acousto-optical device according to claim 10, wherein a fourth polarization conversion stage is interposed between said second polarization conversion stage and said second lateral waveguide.

* * * * *